United States Patent
Dey et al.

(10) Patent No.: US 6,805,927 B2
(45) Date of Patent: Oct. 19, 2004

(54) COMPOSITE LAMINATE STRUCTURES ESPECIALLY USEFUL FOR AUTOMOTIVE TRIM COMPONENTS, AND METHODS AND TIE LAYERS EMPLOYED TO MAKE THE SAME

(75) Inventors: Subir K. Dey, Bridgewater, NJ (US); Subhash H. Patel, Piscataway, NJ (US); Marino Xanthos, Fort Lee, NJ (US)

(73) Assignee: Guardian Industries Corporation, Auburn Hills, MI (US)

(*) Notice: Subject to any disclaimer, the term of this patent is extended or adjusted under 35 U.S.C. 154(b) by 98 days.

(21) Appl. No.: 10/219,942

(22) Filed: Aug. 16, 2002

(65) Prior Publication Data

US 2004/0033365 A1 Feb. 19, 2004

(51) Int. Cl.[7] .................. B32B 27/08; B32B 27/32; B32B 27/34; B60R 13/02
(52) U.S. Cl. .............. 428/31; 428/421; 428/476.1; 428/476.9; 428/515; 428/522; 428/523
(58) Field of Search .................. 428/31, 212, 421, 428/476.1, 476.9, 515, 522, 523, 913.3

(56) References Cited

U.S. PATENT DOCUMENTS

| | | | | |
|---|---|---|---|---|
| 5,532,045 A | * | 7/1996 | Wade | .......... 428/187 |
| 5,554,425 A | * | 9/1996 | Krause et al. | .......... 428/36.91 |
| 5,725,712 A | * | 3/1998 | Spain et al. | .......... 156/230 |
| 5,858,492 A | * | 1/1999 | Roeber et al. | .......... 428/36.91 |
| 6,060,135 A | * | 5/2000 | Service | .......... 428/31 |
| 6,187,233 B1 | | 2/2001 | Smith | .......... 264/75 |
| 6,319,438 B1 | * | 11/2001 | Smith et al. | .......... 264/75 |
| 2001/0051256 A1 | * | 12/2001 | Silagy et al. | .......... 428/212 |
| 2002/0009598 A1 | | 1/2002 | LaFave et al. | .......... 428/421 |

FOREIGN PATENT DOCUMENTS

| | | |
|---|---|---|
| EP | 0 864 417 A3 | 9/1998 |
| EP | 0 864 417 A2 | 9/1998 |

\* cited by examiner

*Primary Examiner*—Ramsey Zacharia
(74) *Attorney, Agent, or Firm*—Nixon & Vanderhye P.C.

(57) ABSTRACT

Laminates include a thermoplastic substrate layer, a clear coat layer, and a tie layer between the substrate and clear coat layers. The tie layer most preferably includes a first layer adjacent the thermoplastic substrate layer which is comprised of a polyolefin, and a second layer adjacent to the clear coat layer which is comprised of a polyamide. Most preferably, the substrate layer is TPO and the clear coat layer is PVF. The laminates may be employed to manufacture a variety of shaped articles, most preferably automotive trim components.

20 Claims, 1 Drawing Sheet

Figure 1:
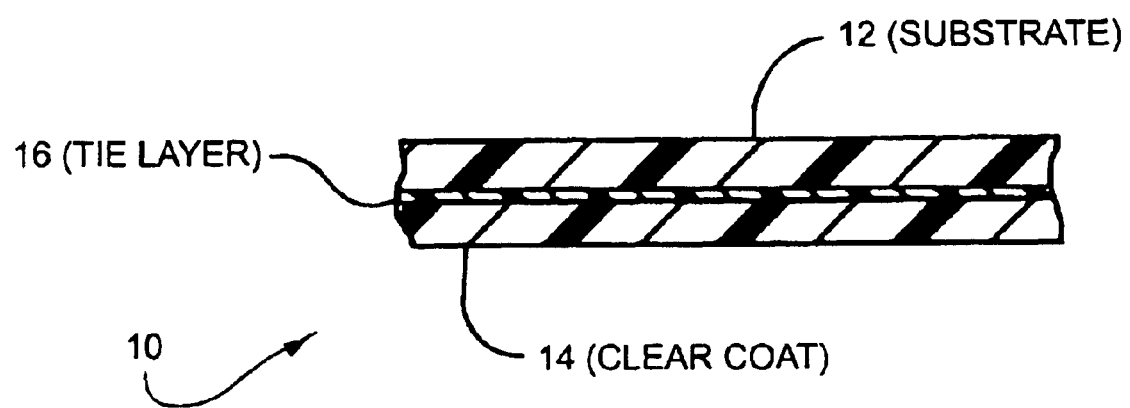

COMPOSITE LAMINATE STRUCTURES ESPECIALLY USEFUL FOR AUTOMOTIVE TRIM COMPONENTS, AND METHODS AND TIE LAYERS EMPLOYED TO MAKE THE SAME

CROSS-REFERENCE TO RELATED APPLICATIONS

This application may be deemed to be related to copending and commonly owned U.S. patent application Ser. Nos. 09/993,900, 09/993,908 and 09/993,909, each filed on Nov. 27, 2001, the entire content of each being incorporated expressly hereinto by reference.

FIELD OF THE INVENTION

The present invention is related generally to tie layers that may be employed to adhesively bond plastic film layers and/or sheets one to another to form composite laminate structures. More specifically, the present invention relates to composite laminate structures that are particularly usefully employed in the manufacture of automotive components (especially exterior automotive trim components).

BACKGROUND AND SUMMARY OF THE INVENTION

It is notoriously well known to apply automotive trim components made of plastics material to the exterior of automotive vehicles, such as cars, trucks, vans and the like. Examples of such trim components include accent stripes, side door bumper elements, claddings, wheel covers, grills, and bumper fascia. Moreover, other automotive components that are made from plastics, such as automotive body panels (e.g., door side panels) and the like are known.

Problems have been encountered in the past when the color of automotive components formed from plastics materials is attempted to be matched or coordinated with the overall body color. For example, such components have typically been painted with a final "clear coat" being applied for purpose of protecting the underlying colored or pigmented paint coat.

It has recently been proposed in U.S. Pat. No. 6,187,233 B1 issued on Feb. 13, 2001 (the entire content of which is expressly incorporated hereinto by reference), to provide a color pigmented thermoplastic layer which is calendered into a laminate structure with a transparent clear coat layer. The laminate is then subsequently vacuum-formed into a three dimensional shaped structure approximating the final shape of the final automotive component. In especially preferred embodiments, the color pigmented layer is a thermoplastic polyolefin (TPO), while the clear coat layer is a fluorinated thermoplastic material, such as polyvinyl fluoride (PVF).

While the techniques described in the above-noted U.S. '233 are satisfactory, certain improvements therein are still desirable. For example, it would be highly desirable if the bonding strength between the color pigmented and clear coat layers could be enhanced. It is towards providing such improvements that the present invention is directed.

Broadly, the present invention is embodied in laminates which include thermoplastic substrate layer, a clear coat layer, and a tie layer, wherein the tie layer includes a first layer adjacent the thermoplastic substrate layer which is comprised of a polyolefin, and a second layer adjacent to the clear coat layer which is comprised of a polyamide. Most preferably, the substrate layer is TPO and the clear coat layer is PVF.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein FIG. 1 is an enlarged cross-sectional view of a laminate sheet in accordance with the present invention.

DETAILED DESCRIPTION OF THE INVENTION

As shown in accompanying FIG. 1, the laminate 10 in accordance with the present invention most preferably includes a thermoplastic substrate layer 12, a clear coat layer 14, and a tie layer 16 which adhesively laminates the substrate and clear coat layers 12, 14 one to the other. The laminate 10 is most preferably provided in sheet form of any desired width and may be employed in injection-molding and thermoforming operations (e.g., as disclosed in the above-cited U.S. '233 patent) so as to form a variety of composite components, such as automotive trim components. Most preferably, the substrate layer 12 is colored with a colorant (pigment) blended homogeneously therewith.

The substrate layer 12 may be formed from virtually any thermoplastic material that is capable of subsequent thermoforming (e.g., so as to allow thermoformed contours and shapes to be formed in the manufacture of automotive trim components). In especially preferred forms, the substrate layer is formed of a thermoplastic polyolefin (TPO). A variety of TPO materials are commercially available, such as E-3000 grade TPO available commercially from Solvay Engineered Polymers and PD 801 grade TPO available commercially from Equistar Chemicals, LP. The TPO may be "neat" (that is, provided without any additives therein) or, more preferably, may be blended with virtually any additive conventionally employed in engineered resins generally. Thus, the TPO materials that may be employed satisfactorily in the practice of the present invention may include one or more colorants, ultraviolet stabilizers, fillers, antioxidants, processing aids and the like as may be desired or necessary for particular end-use applications.

The clear coat layer 14 is transparent or at least substantially transparent to visible light. Thus, for example, the clear coat layer is most preferably at least 90% transparent to visible light, and typically at least 95% transparent to visible light. The purpose of the clear coat layer 14 is to provide a high gloss finish to the products made from the laminate 10 and to protect the substrate layer 12 (e.g., so as to provide a layer which is resistant to scratching, UV radiation, abrasions, marring, heat and weathering). Most preferably, the clear coat layer includes a fluorinated thermoplastic (e.g., a polyvinyl fluoride, PVF). One particularly preferred PVF that may be employed as a clear coat layer 14 in the laminate 10 of the present invention is TEDLAR® polyvinyl fluoride commercially available from E. I. duPont de Nemours, Inc. ("duPont") of Wilmington, Del. Particularly preferred for use in the present invention are PVF films commercially available from duPont as TEDLAR® TTR 10 AH8 and TEDLAR® TTR 10 AM8.

Most preferably, the thickness of the clear coat layer will typically be between about 0.1 mil to about 4.0 mils, and typically between about 0.5 mil to about 1.5 mils. An especially preferred thickness of the clear coat layer is about 1.0 mil. In this regard, it will be understood that the thickness of the clear coat layer 14 expressed immediately above is in the absence of any protective layer that may be provided by the supplier as a means to protect the clear coat during processing and/or to assist the lamination of the clear coat layer to the substrate layer 12.

When employing PVF as the clear coat layer, it is advantageous that a surface thereof be primed with a layer of a suitable adhesion promoting agent. For example, when PVF is employed as a clear coat material in accordance with the present invention, it is preferred that one surface layer of the PVF film be primed with a layer of an acrylic polymer functioning as the adhesion promoting agent.

The adhesive bond between the base and clear coat layers 12, 14, respectively, is enhanced by virtue of the tie layer 16. In this regard, the tie layer in accordance with the present invention most preferably is itself a multilayer film material having one layer comprised of a polyolefin and another layer comprised of a polyamide. In this regard, the polyolefin layer may be one selected from polypropylene and polyethylene, with polypropylenes being especially preferred. The polyolefin may also be a polymer having a polypropylene backbone to which is grafted maleic anhydride moieties. The maleic anhydride moieties grafted onto the polymer backbone will typically be present in an amount of at least about 0.5 wt. %, more preferably at least about 1.0 wt. %, and most preferably about 2.0 wt. %. The polyamide layer is most preferably a nylon, such as nylon 11, nylon 6, nylon 6,6, nylon 6,12, including mixtures and copolyamides of the same.

It is important that the tie layer be positioned properly with respect to the substrate and clear coat layers. For example, when employing TPO and PVF as the substrate and clear coat layers, respectively, it is important that the polyolefin side of the tie layer be positioned adjacent to the TPO layer, while the polyamide side of the tie layer be positioned adjacent to the PVF layer.

Because the tie layer is interposed physically between the substrate layer 12, and the clear coat layer 14, it likewise will most preferably be substantially transparent to visible light. Thus, for example, the tie layer 16 will most preferably exhibit a transparency to visible light of at least about 75% or greater. In especially preferred embodiments of the invention, the tie layer 16 will be at least about 90% transparent to visible light. In addition, the tie layer 16 will be relatively thin as compared to the thickness of the substrate and/or clear coat layers 12, 14, respectively. In preferred embodiments, the thickness of the tie layer will be about 7.5 mils or less, more preferably about 5 mils or less, and most preferably about 3 mils or less.

A preformed multilayer sheet of the substrate layer 12 and the tie layer 16 may be provided by co-extruding the substrate layer material and the tie layer material through a sheet die of desired width according to well known coextrusion techniques. The coextruded substrate and tie layers 12, 16 may then be allowed to cool and taken up in roll form for subsequent lamination with the clear coat layer 14 which is itself most preferably provided in roll form. Alternatively, the coextruded substrate and tie layers 12, 16 may be laminated continuously with a clear coat layer and cooled in line.

The present invention will be further understood by reference to the following non-limiting Examples.

EXAMPLES

The following components were employed in the Examples below:

Thermoplastic Polyolefin (TPO): PD 801 grade TPO available commercially from Equistar Chemicals, LP Polyvinyl Fluoride (PVF): TEDLAR® TTR 10 AH8 clear coat sheet commercially available from E. I. duPont de Nemours Inc. of Wilmington, Del.

V-605-4: A two-layer film comprised of one layer of modified polypropylene and another layer comprised of a copolyamide with a melting point between 230–248° F. and a melt flow rate (190° C./2.16 kg) of between 20 and 30 g/10 min. which is commercially available from Sarna Xiro AG of Schmitten, Switzerland.

V662-2 (XAF 45.301): Two layer films comprised of one layer of modified copolypropylene and another layer comprised of a copolyamide with a melting point between 230–302° F. which is commercially available from Sarna Xiro AG of Schmitten, Switzerland.

POLYBOND 3200: A polypropylene backbone grafted with 1 wt. % maleic anhydride commercially available from Crompton Corporation having a melting point of 157° C. and a melt flow rate (190° C./2.16 kg) of between 90 to 140 g/10 min.

RILSAN 3751: Nylon-11 commercially available from Atofina Corporation.

Example 1 (Comparative)

TPO was extruded using a 1-inch diameter 24 L/D single screw extruder through a 10-inch wide sheet die with a 40 mil opening and was cast onto a 4-inch diameter temperature controlled polished three roll stack. Attempts to make on-line and off-line laminations between a PVF film did not produce any adhesion between the TPO and the PVF.

Example 2 (Invention)

A 40 mil thick, 1'×1' multilayer laminate structure was made having a tie layer of V605-4 interposed between layers of TPO and PVF. The olefin side of the tie layer was positioned adjacent to the TPO layer, while the copolyamide side of the tie layer was positioned adjacent to the PVF layer. The multilayer structure was subjected to lamination at a lamination temperature of 250° F. and a lamination force of 1000 lbs. No adhesive failure was observed during room temperature peel tests of the resulting laminate. The color and color depth of the TPO was clearly visible through the PVF and tie layers.

Example 3 (Invention)

TPO was extruded using a 1-inch diameter 24 L/D single screw extruder through a 10-inch wide sheet die with a 40 mil opening and at a die temperature of 400° F. and was cast onto a 4-inch diameter temperature controlled polished three roll stack. Both the PVF and the V662-2 (XAF 45.301) were fed in the nip region of the roller so that the olefin side of the tie layer material was positioned to contact the TPO. No adhesive failure was observed during room temperature peel tests of the resulting laminate. The color and color depth of the TPO was clearly visible through the PVF and tie layers.

Example 4 (Invention)

A multilayer structure of TPO, POLYBOND 3200 and RILSAN 3751 was coextruded through a 10-inch wide sheet die with a 40 mil opening and was cast onto a 4-inch diameter temperature controlled polished three roll stack. PVF film was fed into the nip region of the roller so as to contact the Rilsan 3751. No adhesive failure was observed during room temperature peel tests of the resulting laminate. The color and color depth of the TPO was clearly visible through the PVF and tie layers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A laminate comprised of a thermoplastic substrate layer, a clear coat layer, and a tie layer between said substrate and clear coat layers, wherein said tie layer includes a first layer adjacent said thermoplastic substrate layer which is comprised of a polyolefin, and a second layer adjacent said clear coat layer which is comprised of a polyamide, and wherein the tie layer is at least 75% transparent to visible light.

2. The laminate of claim 1, wherein said polyolefin is selected from the group consisting of polypropylene and polyethylene.

3. The laminate of claim 1, wherein said polyolefin is a modified polypropylene.

4. The laminate of claim 1, wherein said polyolefin includes a polypropylene backbone grafted with maleic anhydride moieties.

5. The laminate of claim 4, wherein said maleic anhydride moieties are present in an amount of at least about 0.5 wt. %.

6. The laminate of claim 1, wherein said polyamide includes a nylon polymer.

7. The laminate of claim 6, wherein said nylon is selected from nylon 11, nylon 6, nylon 6,6 and nylon 6,12.

8. The laminate of any one of claims 2–7, wherein the substrate layer is a thermoplastic polyolefin (TPO), and said clear coat layer is a polyvinyl fluoride (PVF).

9. The laminate of claim 1, wherein the substrate layer is a thermoplastic polyolefin (TPO).

10. The laminate of claim 9, wherein the clear coat layer is a polyvinyl fluoride (PVF).

11. The laminate of claim 1, wherein the clear coat layer is a polyvinyl fluoride (PVF).

12. A shaped article which includes a laminate according to any one of claims 1–7 and 9–10.

13. The shaped article of claim 12, in the form of an automotive trim component.

14. A shaped article which includes a laminate according to claim 8.

15. Automotive trim which comprises as a visible component a laminate comprised of a thermoplastic substrate layer, a clear coat layer, and a tie layer interposed between and adhesively bonding said thermoplastic substrate layer and said clear coat layer, wherein said tie layer includes a first layer adjacent said thermoplastic substrate layer which is comprised of a polyolefin, and a second layer adjacent said clear coat layer which is comprised of a polyamide, and wherein the tie layer is at least 75% transparent to visible light.

16. The automotive trim of claim 15, wherein the substrate layer includes an amount of a colorant so as to impart a predetermined color to the laminate.

17. The automotive trim of claim 16, wherein said clear coat layer is at least 90% transparent to visible light.

18. The automotive trim of claim 15, wherein said substrate layer is a thermoplastic polyolefin (TPO).

19. The automotive trim of claim 18, wherein said clear coat layer is a polyvinyl fluoride (PVF).

20. The automotive trim of any one of claims 15–17, wherein the clear coat layer is a polyvinyl fluoride (PVF).

* * * * *